US010972880B2

(12) United States Patent
D'Angelo et al.

(10) Patent No.: US 10,972,880 B2
(45) Date of Patent: *Apr. 6, 2021

(54) DIGITAL VOUCHER PROCESSING SYSTEM

(71) Applicant: Accenture Global Services Limited, Dublin (IE)

(72) Inventors: Giovanni D'Angelo, Rome (IT); Piergiorgio Rettaroli, Rome (IT); Salvatore Gifuni, Benevento (IT); Fabio Mungo, Rome (IT)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,712

(22) Filed: Jul. 3, 2019

(65) Prior Publication Data

US 2019/0327585 A1 Oct. 24, 2019

Related U.S. Application Data

(63) Continuation-in-part of application No. 15/141,957, filed on Apr. 29, 2016, now Pat. No. 10,382,910.
(Continued)

(51) Int. Cl.
*G06Q 30/00* (2012.01)
*G06Q 20/00* (2012.01)
(Continued)

(52) U.S. Cl.
CPC ............ *H04W 4/14* (2013.01); *G06Q 20/327* (2013.01); *G06Q 20/3278* (2013.01);
(Continued)

(58) Field of Classification Search
CPC ........... H04W 4/14; H04W 4/50; H04W 4/35; H04W 4/80; H04W 4/18; H04W 12/08;
(Continued)

(56) References Cited

U.S. PATENT DOCUMENTS 5,900,883 A * 5/1999 Crucs .................. G06T 1/00
345/418
5,978,013 A * 11/1999 Jones ................ G06Q 20/387
348/465
(Continued)

FOREIGN PATENT DOCUMENTS

CN 101351809 A 1/2009
EP 1 030 273 A2 8/2000
(Continued)

OTHER PUBLICATIONS

Klinger, T. (2003). Image processing with LabVIEW and IMAQ vision. Upper Saddle River, NJ: Prentice Hall PTR, ISBN-10: 0130474150, pp. 125-129. (Year: 2003).*
(Continued)

*Primary Examiner* — Kambiz Abdi
*Assistant Examiner* — Dipen M Patel
(74) *Attorney, Agent, or Firm* — Brinks Gilson & Lione

(57) ABSTRACT

A digital voucher system facilitates the convenient application of vouchers against products and services purchased from a merchant by a consumer. A voucher enabled device carried by the consumer stores digital vouchers in memory. The merchant queries and obtains applicable vouchers for the consumer from the voucher enabled device carried by the consumer, applies the vouchers to a transaction, and communicates the resulting transaction data back to the voucher enabled device.

20 Claims, 9 Drawing Sheets

Related U.S. Application Data which is a continuation-in-part of application No. 12/422,675, filed on Apr. 13, 2009, now abandoned.

(51) Int. Cl.

| | |
|---|---|
| *H04W 4/14* | (2009.01) |
| *H04W 4/50* | (2018.01) |
| *G06Q 30/02* | (2012.01) |
| *G06Q 20/32* | (2012.01) |
| *H04W 4/18* | (2009.01) |
| *H04W 12/08* | (2021.01) |
| *H04L 29/08* | (2006.01) |
| *G06Q 20/38* | (2012.01) |
| *G06Q 50/12* | (2012.01) |

(52) U.S. Cl.
CPC ........... *G06Q 20/387* (2013.01); *G06Q 30/02* (2013.01); *G06Q 30/0238* (2013.01); *G06Q 50/12* (2013.01); *H04L 67/22* (2013.01); *H04W 4/18* (2013.01); *H04W 4/50* (2018.02); *H04W 12/08* (2013.01)

(58) Field of Classification Search
CPC .... G06Q 50/12; G06Q 30/0238; G06Q 30/02; G06Q 20/3278; G06Q 20/387; G06Q 20/0457; G06Q 20/322; G06Q 20/346; G06Q 20/351; G06Q 20/327; G06Q 30/0207–0277; H04L 67/22; H04L 67/02; H04L 67/26
USPC ...................................................... 705/14.1
See application file for complete search history.

(56) References Cited

U.S. PATENT DOCUMENTS

| | | | |
|---|---|---|---|
| 6,487,180 B1 | 11/2002 | Borgstahl et al. | |
| 6,587,835 B1 | 7/2003 | Treyz et al. | |
| 7,024,205 B1 | 4/2006 | Hose | |
| 8,095,113 B2* | 1/2012 | Kean | G06F 21/31 455/410 |
| 2002/0042753 A1 | 4/2002 | Ortiz et al. | |
| 2003/0074259 A1 | 4/2003 | Slyman, Jr. et al. | |
| 2003/0233276 A1 | 12/2003 | Pearlman et al. | |
| 2003/0236712 A1 | 12/2003 | Antonucci et al. | |
| 2004/0243519 A1 | 12/2004 | Perttila et al. | |
| 2005/0131761 A1 | 6/2005 | Trika et al. | |
| 2007/0168288 A1* | 7/2007 | Bozeman | G06Q 20/382 705/51 |
| 2007/0203792 A1* | 8/2007 | Rao | G06Q 20/325 705/14.35 |
| 2007/0288313 A1 | 12/2007 | Brodson et al. | |
| 2008/0041950 A1* | 2/2008 | Michels | G06Q 30/0207 235/419 |
| 2008/0097855 A1 | 4/2008 | Rissanen | |
| 2008/0208688 A1* | 8/2008 | Byerley | H04M 15/8083 705/14.39 |
| 2008/0255947 A1* | 10/2008 | Friedman | G06Q 20/32 705/35 |
| 2008/0299904 A1 | 12/2008 | Yi et al. | |
| 2009/0018964 A1 | 1/2009 | Liu et al. | |
| 2009/0061884 A1 | 3/2009 | Rajan et al. | |
| 2009/0099929 A1 | 4/2009 | Thibedeau et al. | |
| 2009/0106115 A1 | 4/2009 | James et al. | |
| 2009/0198563 A1* | 8/2009 | Tung | G06Q 30/0263 705/14.53 |
| 2009/0222329 A1* | 9/2009 | Ramer | G06Q 30/0254 705/14.52 |
| 2009/0307080 A1* | 12/2009 | Jain | G06Q 30/02 705/14.38 |
| 2009/0307139 A1 | 12/2009 | Mardikar et al. | |

FOREIGN PATENT DOCUMENTS

| | | |
|---|---|---|
| EP | 1 197 929 A2 | 4/2002 |
| WO | WO 2005/083640 A1 | 9/2005 |
| WO | WO 2006/031202 A1 | 3/2006 |
| WO | WO 2007/030480 A2 | 3/2007 |
| WO | WO 2008/083105 A2 | 7/2008 |
| WO | WO 2008/157806 A2 | 12/2008 |

OTHER PUBLICATIONS

CCITT "Information Technology—Digital Compression and Coding of Continuous-Tone Still Images—Requirements and Guidelines." The World Wide Web Consortium (W3C), International Telecommunication Union, 1993, www.w3.org/Graphics/JPEG/itu-t81.pdf, pp. 1-28 and 36-54 (Year: 1993).*

App. No. EP 09 425 063, European Search Report dated Jun. 16, 2009, 5 pages.

App. No. EP 09 425 063.6, European Examination Report dated Sep. 14, 2011, 7 pages.

Wikipedia, the free encyclopedia, Near Field Communication, Oct. 13, 2010, pp. 1-6, http://en.wikipedia.org/wiki/Near_Field_Communication.

English translation of Chinese Application No. 201010119667.5, Office Action dated Sep. 3, 2013, pp. 1-5.

* cited by examiner

DIGITAL VOUCHER PROCESSING SYSTEM

PRIORITY CLAIM

This application is a continuation-in-part of and claims priority to U.S. patent application Ser. No. 15/141,957, filed Apr. 29, 2016, titled Wireless Transfer Protocol for Electronic Certificates, now U.S. Pat. No. 10,382,910, which is a continuation-in-part of and claims priority to Ser. No. 12/422,675, filed Apr. 13, 2009, titled Digital Voucher Processing System, each of which being incorporated by reference in its entirety herein.

CROSS-REFERENCE TO RELATED APPLICATIONS

This application is related to European Patent Application No. 09425063.6, filed Feb. 16, 2009, which is incorporated by reference in its entirety herein.

TECHNICAL FIELD

This disclosure relates to digital voucher processing systems. More particularly, this disclosure relates to proximity detection of voucher enabled devices and merchant system interaction with the voucher enabled devices to query for, obtain, and process digital vouchers carried by the digital voucher enabled devices.

BACKGROUND

Vouchers in the form of paper certificates or coupons have traditionally been used to obtain discounts on goods and services. The paper voucher as a discount mechanism suffers from significant drawbacks, however. As examples, the paper vouchers, once distributed, are extremely difficult or impossible to retire, recall, modify in value, transfer to another entity, or otherwise manage. It is also difficult to create and implement effective anti-fraud control for paper vouchers, and to create, print, and physically distribute paper vouchers to a wide audience.

Prior attempts to migrate paper vouchers to electronic representations also suffered from significant drawbacks. In some instances, dedicated electronic cards have been employed to carry digital vouchers. However, the electronic cards are easily lost and susceptible to use by others. Such cards also require special purpose additional hardware and communication protocols, connected with back-end systems, leading to increased system cost and complexity.

A need exists for an improved digital voucher management system.

SUMMARY

A digital voucher system facilitates the convenient application of vouchers against products and services purchased from a merchant by a consumer. A voucher enabled device carried by the consumer stores digital vouchers in memory. When the merchant detects a voucher enabled device nearby, the merchant queries and obtains applicable vouchers for the consumer from the voucher enabled device carried by the consumer, applies the vouchers to a transaction, and communicates the resulting transaction data back to the voucher enabled device.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

Figure 1:
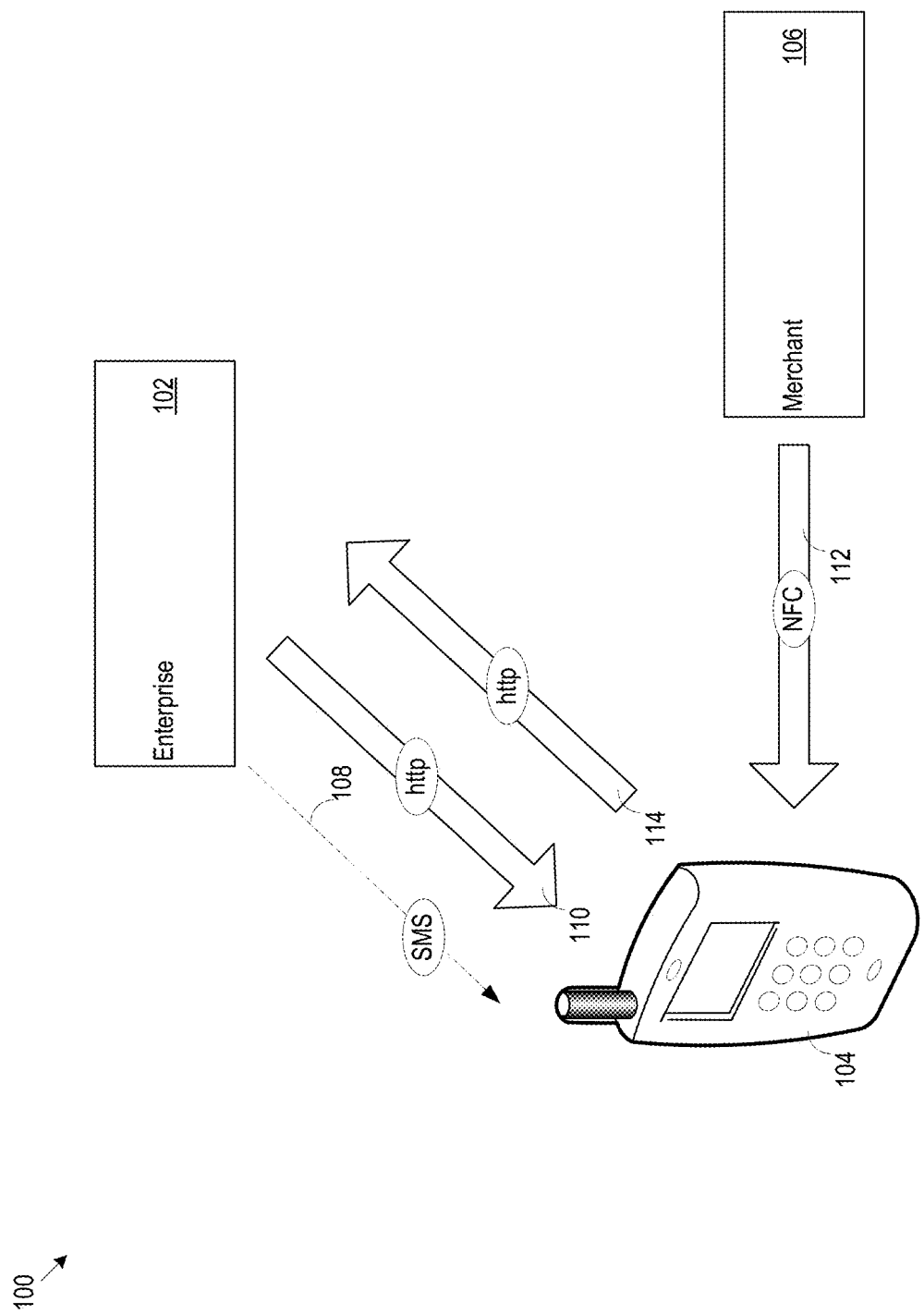
FIG. 1 shows the entities that interact in a digital voucher environment.

FIG. 1 shows the entities that interact in a digital voucher environment 100. The environment includes an enterprise system 102, a digital voucher enabled mobile device 104, and a digital voucher enabled merchant system 106. The digital voucher enabled mobile device 102 may be a cellular phone on which is installed a digital voucher subscriber application that facilitates processing and using the digital vouchers on the consumer end of transactions. The device 102 is not limited to cell phones, but may be virtually any portable electronic device, including a pager, portable game system, personal data assistant, music player, or other portable device. The digital voucher enabled merchant device 104 may be a mobile device or countertop-mounted device on which is installed a digital voucher merchant application that facilitates processing digital vouchers on the merchant end of transactions. The merchant device 104 may also be a part of or be connected to an electronic device for calculating and recording sales transactions, such as a cash register.

The enterprise system 102 may include an enterprise application that aids in the creation of digital vouchers, as well as their assignment to the digital voucher enabled mobile device 104. The enterprise system 102 may be a desktop, handheld, or other network enabled computing device.

The digital voucher enabled mobile device 104 allows a consumer to maintain a paperless inventory of vouchers and apply those vouchers to transactions in real time using contactless communication technology. The digital vouchers may include ticket restaurants, meal tickets, percentage or fixed discount coupons, fidelity card services, promotional or direct advertising content, travel vouchers or tickets, or other electronic certificates worth a certain value, percentage, or discount in purchasing goods and services.

The mobile device 104 and merchant system 106 are each equipped with proximity communication interfaces to facilitate proximity communication between the mobile device 104 and merchant system 106. The proximity communication interfaces may be, for example, near field communication (NFC) interfaces. Such interfaces support localized wireless bi-directional communication capability over a relatively short range, such as 0-10 cm, though other ranges may also be employed. The mobile device 104 and merchant system 106 may alternatively be equipped with communication interfaces that utilize Bluetooth, radio-frequency identification (RFID), infrared data association (IrDa), WiFi, or other proximity communication technologies.

The proximity communication interface of the merchant system 106 may be a camera (e.g., digital camera) for capturing a barcode image or other optical machine-readable representation of data displayed on the mobile device 104. The barcode may be a linear, 2D (such as QR code), or other type of barcode representing data associated with the digital voucher to be transferred to the merchant. The proximity communication interface of the merchant system 106 may also be any other device equipped to capture or read a barcode image displayed on a mobile device.

The enterprise system 102 may be a network enabled system that communications through a communications network with the mobile device 104 and/or with the merchant system 106. The enterprise system 102 may also communicate with the mobile device 104 through a digital voucher service provider. The enterprise system 102 may communicate with the mobile device 104 and/or merchant system 106 through an SMS message, an email, or other network communication protocols.

In one example, the enterprise system 102 sends a notification message 108 to the mobile device 104 through an SMS message when digital vouchers have been created and/or assigned. Then enterprise system 102 may assign a digital voucher to the mobile device 104 by associating the digital voucher with the MSISDN of the mobile device 104. The enterprise system 102 may include a database, list, or other set of information containing the MSISDN's of digital voucher enabled mobile devices. An SMS message is merely one example of the communication protocols the enterprise system may use to communicate with the mobile device 104.

When notified of the new digital vouchers, the mobile device 104 synchronizes 110 a user account associated with the mobile device 104 with a corresponding user account maintained by the enterprise system 102 over a communications network. The synchronization 110 may be initiated automatically upon receipt of the notification message 108 that new digital vouchers have been assigned, or may be initiated manually by the consumer using the mobile device 104 through the digital voucher subscriber application installed on the mobile device 104. Once synchronized, the digital voucher is stored on the mobile device 104 and may be transferred to a digital voucher enabled merchant system 106 in connection with a business transaction.

When the consumer enters into a transaction with an affiliated merchant (e.g., a merchant utilizing the digital voucher enabled merchant system 106), the mobile device 104 and merchant system 106 may open a communication channel 112 through their respective proximity communication interfaces when sufficiently proximate to each other. Sufficient proximity may depend on the proximity communication technology used. For example, for NFC sufficient proximity between the communication interfaces of the mobile device 104 and the merchant system 106 may be up to approximately 10 cm. For Bluetooth, sufficient proximity may be up to approximately 30 m. For RFID, sufficient proximity may be up to approximately 3 m. For IrDa, sufficient proximity may be up to approximately 5 m.

If the proximity technology used is NFC, the consumer can hold the mobile device 104 up to, or otherwise pass the mobile device 104 in front of, the merchant system 106 in order to transfer the digital voucher to the merchant. NFC provides an efficient and secure communication channel between the mobile device 104 and the merchant system 106.

If the proximity technology used is QR code recognition, the consumer can hold the mobile device 104 displaying the selected digital voucher up to a camera, infrared scanner or other barcode capturing device. The merchant system 106 may decode the captured barcode to obtain the data associated with the digital voucher.

In connection with the transfer of the digital voucher to the merchant system, the merchant system 106 may transmit merchant data and transaction data (such as the purchase price) to the mobile device 104. The merchant system 106 may receive the digital voucher and consumer data transmitted from the mobile device 104. The merchant device 104 applies the digital voucher to the transaction data to generate updated transaction data. For example, if the digital voucher transmitted by the mobile device 104 is a 10% off discount coupon, the merchant system 106 may reduce the purchase price by 10%.

The merchant system 106 may complete the transaction based on the updated transaction data, or may transmit the updated transaction data to the electronic device or another back-end system for calculating and recording sales transactions for transaction completion. The merchant system 106 may also transmit the updated transaction data to the mobile device 104 through its proximity communication interface. The merchant system 106 and/or the mobile device 104 may transmit a digital voucher transaction summary to the enterprise system 102 or any other entity that created or issued the digital voucher.

Figure 2:
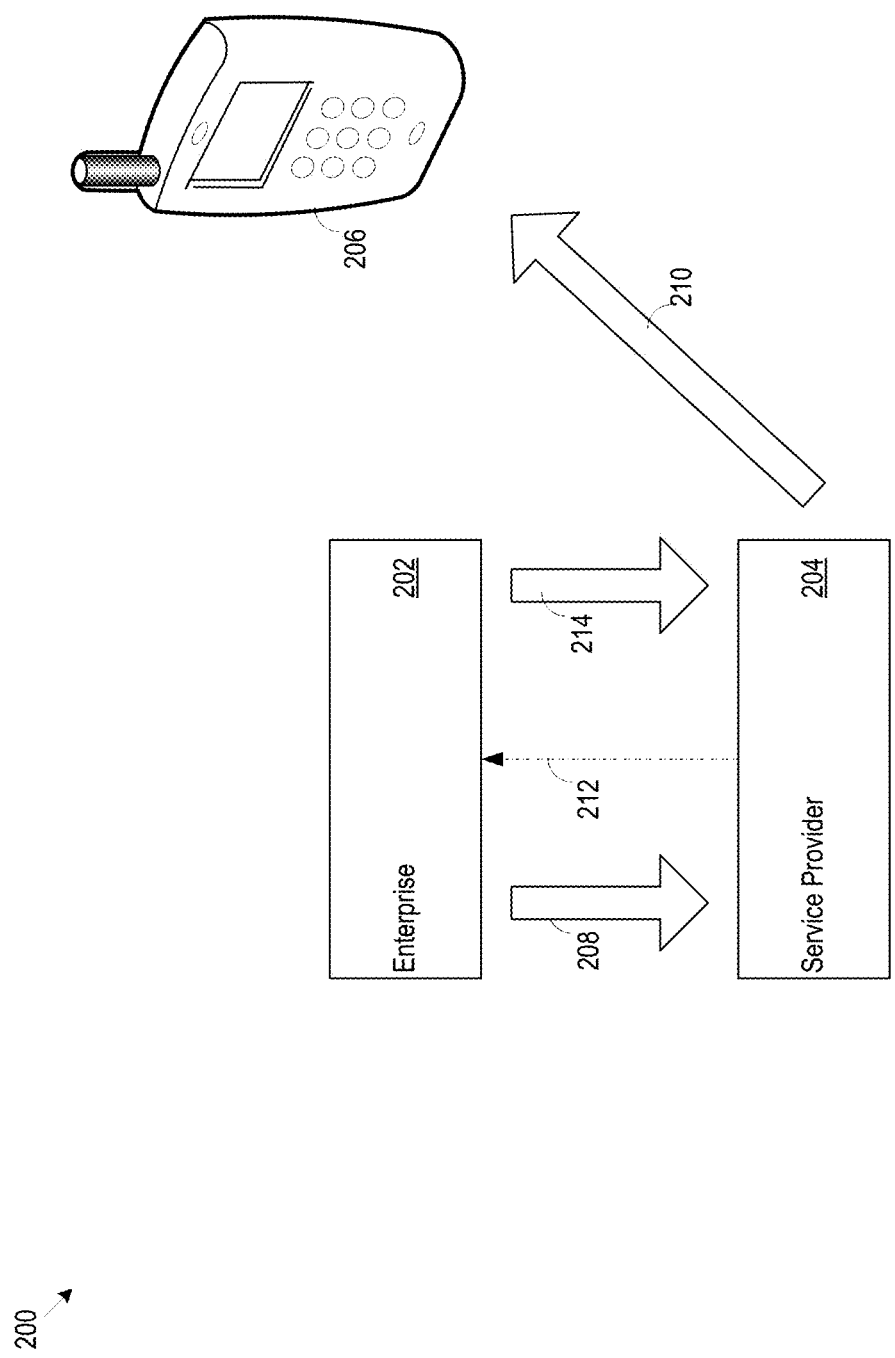
FIG. 2 shows dataflow in an exemplary digital voucher environment.

FIG. 2 shows dataflow in an exemplary digital voucher environment 200 including an enterprise system 202, a digital voucher service provider 204, and a digital voucher enabled mobile device 206. The enterprise system 202 transmits digital voucher distribution instructions 208 to the service provider 204. The service provider 204 may be an entity that creates and/or distributes digital vouchers. The service provider 204 in turn distributes 210 the digital vouchers to the digital voucher enabled mobile device 206 in accordance with the digital voucher distribution instructions 208. Communication between the enterprise system 202, service provider 204, and the mobile device 206 may be implemented through SMS message, email, or other network communication protocols.

The distribution instructions 208 may include a type and quantity of digital voucher to distribute, as well as a list of consumers or mobile devices 206 assigned to receive the digital vouchers. Alternative to the distribution list of specific consumers or mobile devices, the distribution instructions may also include distribution criteria according to which the service provider 204 distributes the digital vouchers. If the digital voucher is a promotional advertisement related to athletics, the distribution instructions may identify the digital voucher for distribution to mobile devices 206 associated with consumers that have an interest in athletics. Consumer interests may be deduced based on the consumer's purchasing and/or browsing history, based on survey data, or based on information provided directly by the consumer. The digital voucher subscriber application installed on the mobile device 206 may also be configured to allow the consumer to specifically request certain types of advertising content, or other types of vouchers. In this manner, digital vouchers, such as advertising content, may be directed to consumers most likely to be interested in such promotional material on their mobile devices 206.

The service provider 204 may transmit a digital voucher distribution summary 212 that summarizes the number and type of digital vouchers sent to consumers within a certain time period. The digital voucher distribution summary 212 may also include an amount due for the service. The enterprise system may transmit a service payment 214 to the service provider based on the digital voucher distribution summary.

Figure 3:
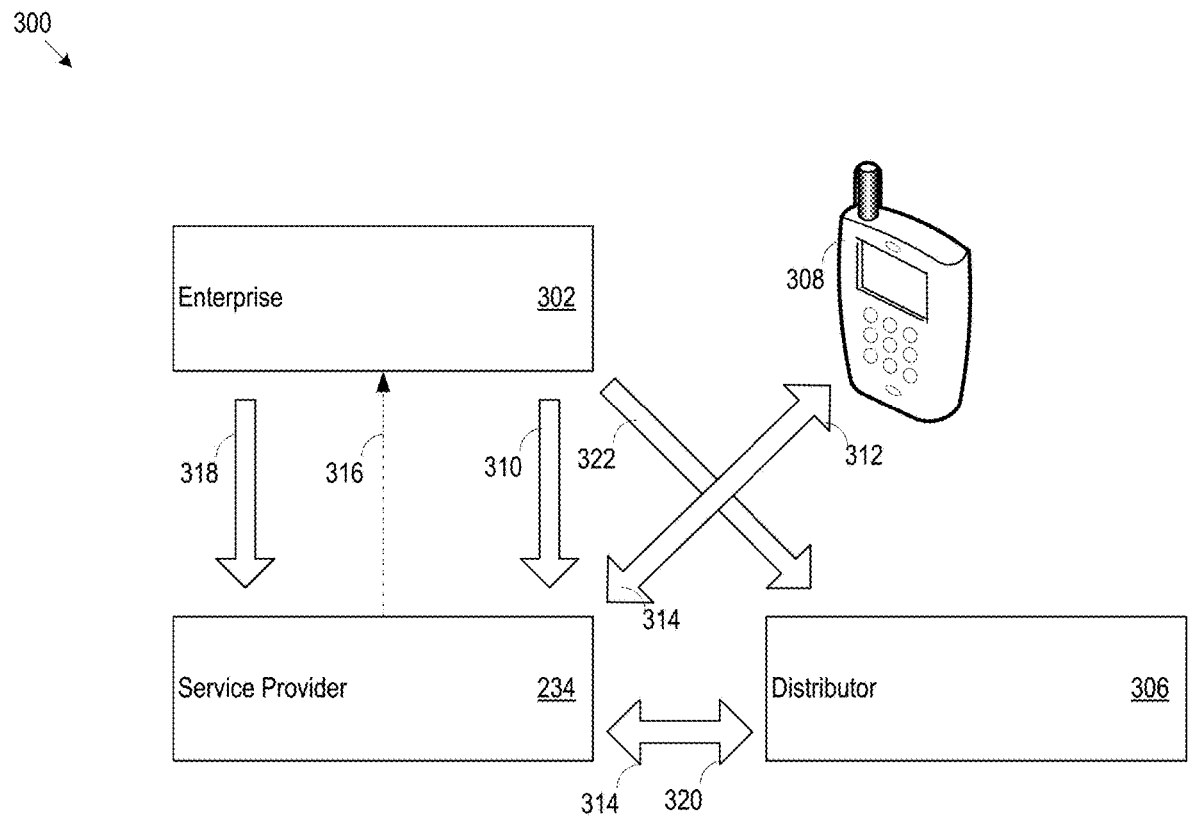
FIG. 3 shows dataflow in another exemplary digital voucher environment.

FIG. 3 shows dataflow in another exemplary digital voucher environment 300 including an enterprise system 302, a digital voucher service provider 304, a digital voucher enabled merchant system 306, and a digital voucher enabled mobile device 308. The enterprise system 302 creates and transmits digital voucher distribution instructions 310 to the service provider 304. The service provider 304 in turn distributes 312 the digital vouchers to the digital voucher enabled mobile device 308 according to the digital voucher distribution instructions.

A consumer using the mobile device 308 may then transfer the digital voucher to the digital voucher enabled merchant system 306 in connection with a transaction. For example, a consumer purchasing a good or service from a merchant using the merchant system 306 may transfer a digital 10% off coupon to the merchant using a digital voucher subscriber application installed on the mobile device 308. The merchant system 306 applies the obtained digital voucher to the transaction to generate an updated purchase price. The merchant system 306 may transmit the updated purchase price to the mobile device 308. The mobile device 308 and merchant system 306 may communicate using NFC, Bluetooth, RFID, IrDa, or other proximity communication protocols. The merchant system 306 may also receive the digital voucher and other data from the mobile device 308 by capturing and decoding a barcode image (such as a QR code image) displayed on the mobile device 308.

When the consumer transfers and the merchant processes the digital voucher in connection with the transaction, the digital voucher subscriber application installed on the mobile device 308, or a digital voucher merchant application installed on the merchant system 306, may transmit a digital voucher transfer report 314 to the service provider 304. The transfer report 314 may include details of the transaction, including information identifying the merchant, the transaction, the digital voucher used, transaction date, and other relevant information.

The service provider 304 may transmit a digital voucher distribution summary 316 that summarizes the number and type of digital vouchers sent to consumers within a certain time period. The digital voucher distribution summary 316 may also include a summary of digital voucher transfer reports 314 indicating digital vouchers actually used and transferred to merchants. The digital voucher distribution summary 316 may also include an amount due for the service. The service provider 304 may also generate and transmit to the merchant system 306 a merchant-specific voucher summary 320 summarizing the number and type of digital vouchers transferred to the merchant within a certain time period.

Based on the digital voucher distribution summary 316, the enterprise system may transmit a service payment 318 to the service provider 304 based on its distribution services. The enterprise system 302 may also refund 322 the merchant the value of the discounts provided in response to the digital voucher.

Figure 4:
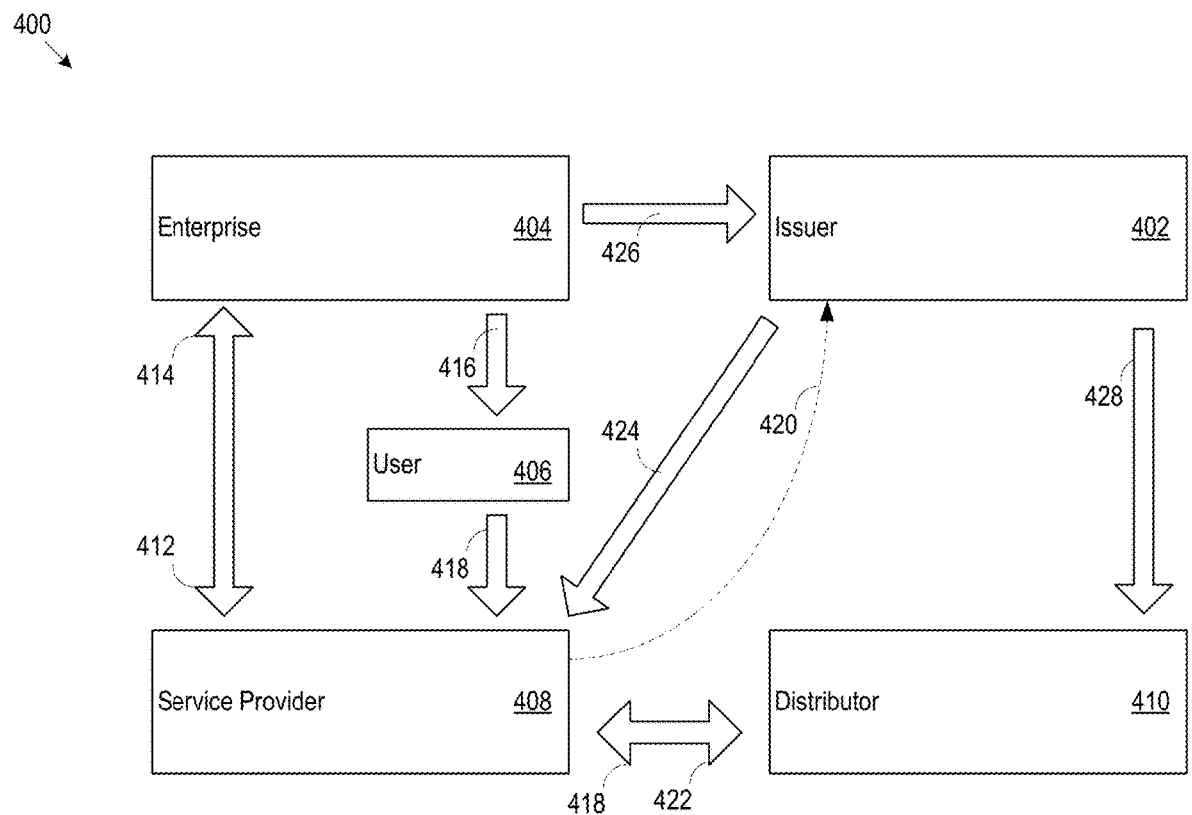
FIG. 4 shows dataflow in another digital voucher environment including a ticket issuer.

FIG. 4 shows dataflow in another exemplary digital voucher environment 400 including a ticket issuer 402. The environment 400 also includes an enterprise system 404, a digital voucher enabled mobile device 406, a digital voucher service provider 408, and a digital voucher enabled merchant system 410.

The ticket issuer 402 may be an entity that issues digital vouchers in the form of, for example, ticket restaurants (luncheon voucher, meal tickets, etc.), transportation tickets, theatre tickets, or other ticket types for distribution to the mobile devices 406 of consumers and/or of the employees of one or more companies. The enterprise system 404 may receive from the ticket issuer 402, or may create based on information received from the ticket issuer 402, ticket distribution instructions 412.

The enterprise system 404 may transmit the ticket distribution instructions 412 to the service provider 408. The service provider 408 issues 414 the digital tickets to the enterprise system 404 based on the ticket distribution instructions 412. The enterprise system 404 distributes 416 the digital tickets to the employee/consumer's mobile device 406.

Using a digital voucher subscriber application installed on the mobile device 406, the employee/consumer can transfer the digital tickets to the merchant system 410 as part of a business transaction. If the digital ticket is a ticket restaurant, the employee/consumer may transfer the ticket restaurant to a food merchant in connection with the purchase of a meal. Upon receipt of the ticket restaurant from the employee/consumer's mobile device 406, the merchant system 410 applies the ticket restaurant to the cost of the meal and updates the meal's cost based on the value of the ticket restaurant. The employee/consumer's mobile device 406 and the merchant system 410 are equipped with proximity communication interfaces for the convenient, quick, and secure transfer of digital tickets to the merchant at the merchant's locale.

When the consumer/employee transfers and the merchant processes the digital ticket in connection with the transaction, the digital voucher subscriber application on the mobile device 406, or a digital voucher merchant application installed on the merchant system 410, may transmit a digital voucher transfer report 418 to the service provider 408. The transfer report 418 may include details of the transaction, including information identifying the merchant, the transaction, the digital ticket used, transaction date, and other relevant information.

The service provider 408 may transmit to the ticket issuer 402 and/or enterprise system 404 a digital voucher distribution summary 420 that summarizes the number and type of digital vouchers sent to consumers within a certain time period. The digital voucher distribution summary 420 may also include a summary of digital voucher transfer reports 418 indicating digital tickets actually used and transferred to merchants. The digital voucher distribution summary 420 may also include an amount due for the service. The service provider 408 may also generate and transmit to the merchant system 410 a merchant-specific voucher summary 422 summarizing the number and type of digital tickets transferred to the merchant within a certain time period.

Based on the digital voucher distribution summary 420, the ticket issuer 402 may transmit a service payment 424 to the service provider 304 based on its distribution services. The enterprise system 404 may pay 426 the ticket issuer 402 for the value of the tickets issued. The ticket issuer 402 may also refund 428 the merchant the value of the discounts provided in response to the digital voucher.

Figure 5:
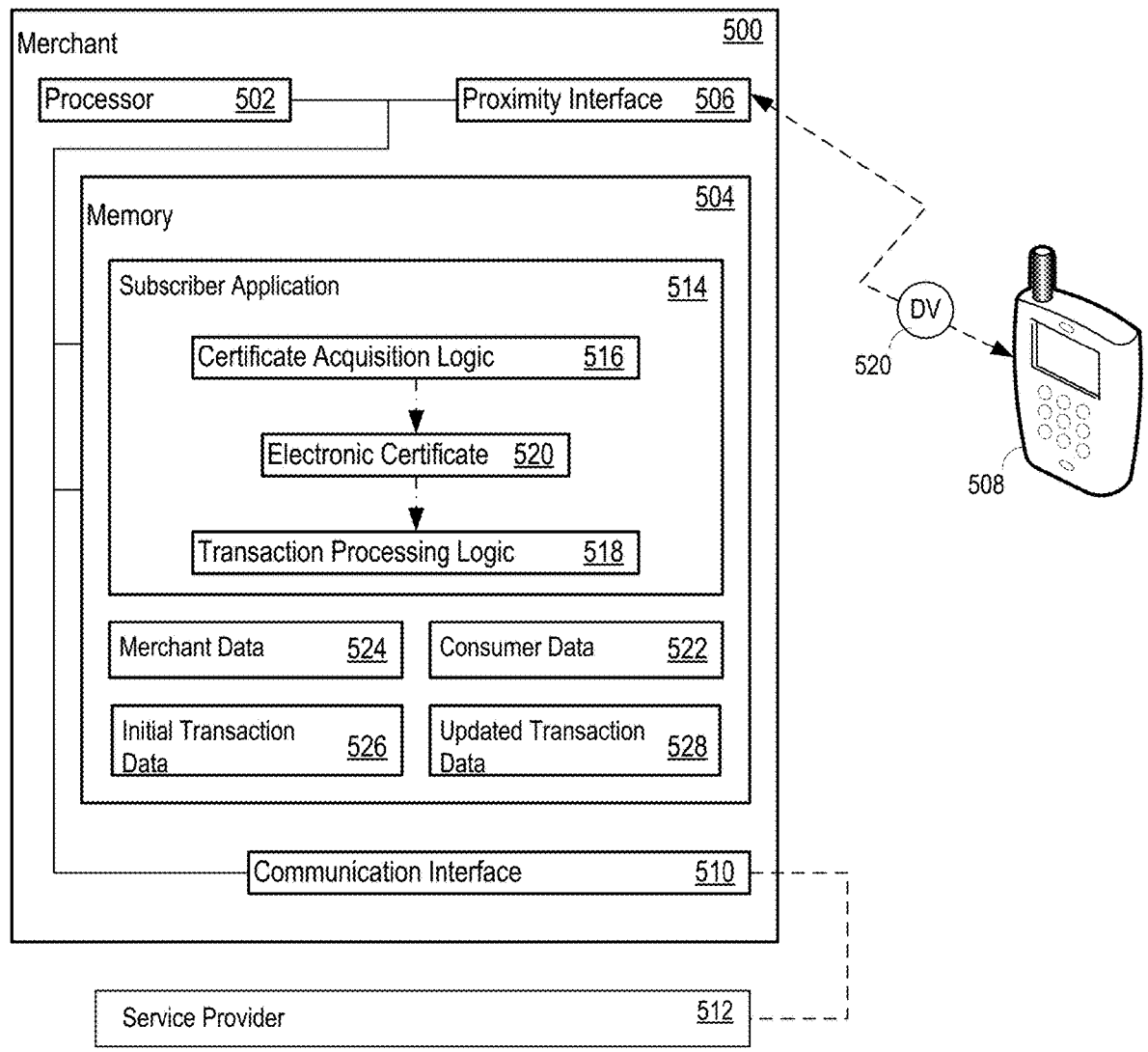
FIG. 5 shows a merchant system for use in a digital voucher environment.

FIG. 5 shows a merchant system 500 for use in a digital voucher environment. The merchant system 500 includes a processor 502 and a memory 504. The merchant system 500 includes a proximity communication interface 506 for communicating with a nearby digital voucher enabled device 508, such as a cellular phone. The merchant system 500 may also include a communication interface 510, such as a network enabled communication interface, for communicating with a digital voucher service provider 512.

The memory 504 holds a digital voucher merchant application 514 that assists in obtaining and processing digital vouchers received from a proximate digital voucher enabled device 508 in connection with a business transaction. The merchant application 514 includes digital voucher acquisition logic 516 and transaction processing logic 518.

The voucher acquisition logic 516 may assist the merchant system 500 in determining that a digital voucher enabled device 508 is proximate to the proximity communication interface 506 and obtaining the digital voucher from the digital voucher enabled device 508 through the interface 506. The memory may hold the obtained digital voucher 520. The digital voucher 520 may include voucher data, such as the voucher type (e.g., whether the voucher is a percentage discount coupon, a ticket restaurant, a promotional advertisement, etc.), a voucher amount, an expiration data, a voucher ID number, a voucher name, a voucher quantity, a voucher service provider (e.g., which service provider distributed or issued the voucher) or other information relevant to processing the digital voucher 520. If the digital voucher 520 is obtained by capturing a barcode image displayed on the mobile device, the voucher acquisition logic may include logic that decodes the barcode image.

The voucher acquisition logic 516 may also obtain, and the memory hold, customer data 522 from the digital voucher enabled device 508. The customer data 522 may include information identifying the customer and/or the customer's mobile device 508, such as the MSISDN or the customer's name.

The memory 504 may also hold merchant data 524 and initial transaction data 526. The merchant data 524 may include information identifying the merchant, such as the merchant's name. The initial transaction data 526 may include information identifying the particular business transaction entered into between the merchant and a customer using the digital voucher enabled device 508. The information identifying the business transaction may include, for example, the type of good or service being purchased and the price. The voucher acquisition logic 516 may transmit the merchant data 524 and transaction data 526 to the digital voucher enabled device 508 through the proximity communication interface 506.

The transaction processing logic 518 may assist the merchant system 500 in applying the digital voucher 520 to a business transaction, and in particular, to the initial transaction data 526 to generate updated transaction data 528. The updated transaction data 528 may be, for example, and new purchase price updated based on the digital voucher 520. If the digital voucher 520 is a percentage for fixed discount coupon, the transaction processing logic 518 may reduce the purchase price by the percentage or fixed discount amount. If the digital voucher 520 is a ticket restaurant valued at, for example, €5, the transaction processing logic 518 may reduce the meal purchase by the value of the ticket restaurant. If the digital voucher 520 is a fidelity card, the transaction processing logic 518 may update the fidelity card based on the business transaction (such as by adding to rewards points associated with the fidelity account). The transaction processing logic 518 transmit the updated transaction data 528 to the digital voucher enabled device 508 through the proximity communication interface 506. The digital voucher merchant application 514 may automatically acquire and process the digital voucher 520, or may include a user interface 530 through which a manager or other merchant personnel initiate digital voucher acquisition and/or processing.

The merchant system 500 may communicate with the service provider 512 through the communication interface 510. The digital voucher merchant application 514 may transmit a digital voucher transaction report summarizing the transaction and identifying the digital voucher used by the digital voucher enabled device 508.

Figure 6:
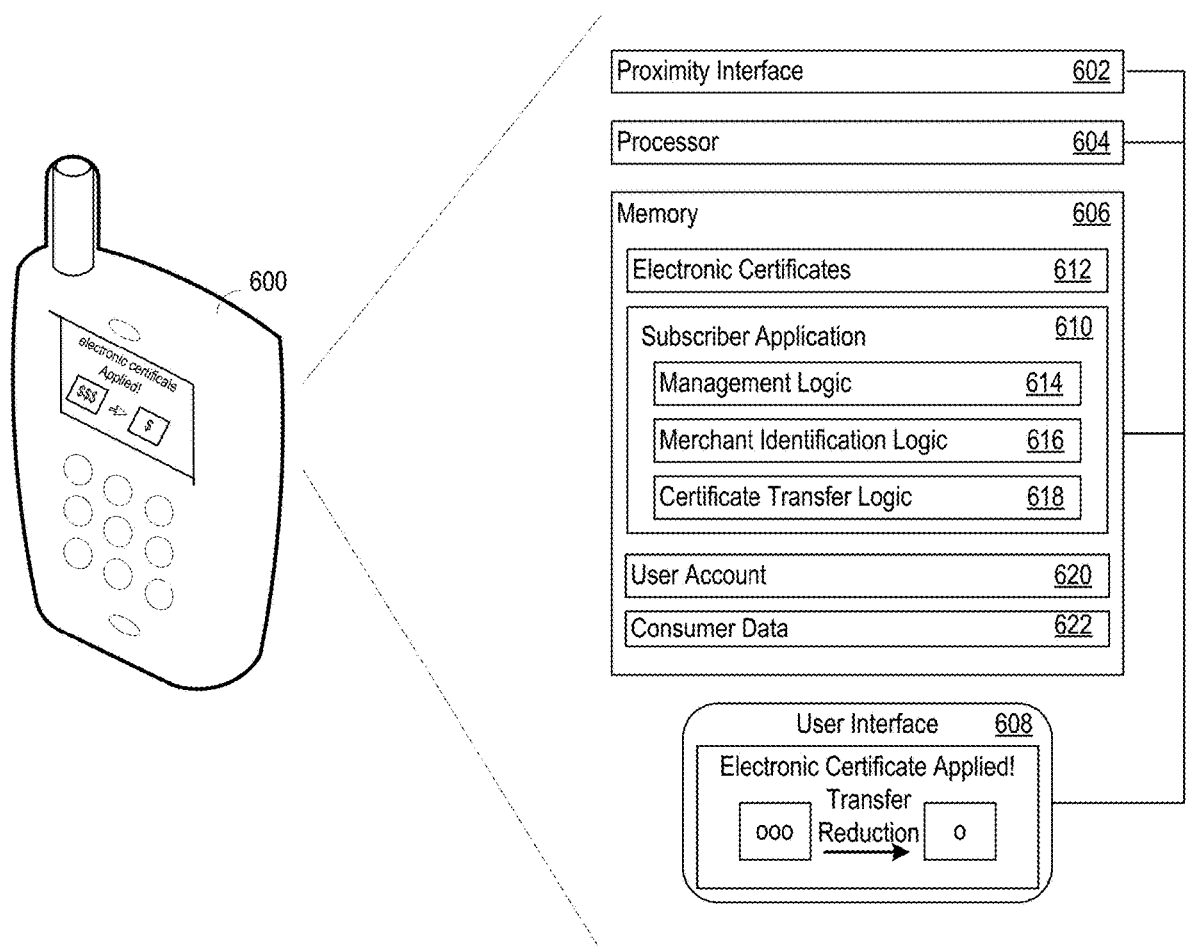
FIG. 6 shows a digital voucher enable device, such as a cellular phone.

FIG. 6 shows a digital voucher enable device 600, such as a cellular phone. The digital voucher enabled device 600 includes a proximity communication interface 602, a processor 604, and a memory 606. The digital voucher enabled device 600 also includes a display 608.

The memory 606 may hold a digital voucher subscriber application 610 that aids a consumer using the device 600 in managing digital vouchers 612 stored on the memory and transferring them to merchants as part of a business transaction. The digital vouchers 612 may be organized in a voucher database 614 stored on the memory 606. The subscriber application 610 may include digital voucher management logic 616, proximate merchant identification logic 618, and digital voucher transfer logic 620.

The digital voucher management logic 616 aids the device 600 in receiving and managing new digital vouchers. The device 600 may receive an SMS message, email, or other type of communication from service provider or enterprise system indicating that new digital vouchers have been assigned to the device 600.

The digital voucher management logic 616 may synchronize a user account 622 stored on the memory 606 with a corresponding user account maintained by the service provider or enterprise system. The digital voucher management logic 616 may initiate synchronization immediately upon being notified of the new digital vouchers, or may prompt the device's 600 user to initiate synchronization through the display 608. Synchronization may include transferring to the mobile device 600 any new digital vouchers assigned to the device 600 by the service provider or enterprise system.

The digital voucher 612 may be transferred as a string of bytes representing voucher data, or parameters. An image associated with the digital voucher 612 may also accompany the transfer. The digital voucher 612 may be downloaded by the mobile device using an HTTP structure or sent to the mobile device as a binary SMS using the UDH port. For example, if the digital voucher 612 includes an image, the meta data associated with the digital voucher 612 may be downloaded using an HTTP structure. If the digital voucher 612 is string of data with no image, the digital voucher 612 may be downloaded using an HTTP structure or sent to the mobile device 600 by SMS, the SMS body including a string of values corresponding to the digital voucher 612. Table 1 below shows an example of digital voucher parameters for a digital voucher 612 that includes an image. Table 2 below shows an example of digital voucher parameters for a digital voucher 612 that does not include an image.

TABLE 1

Voucher quantity
Voucher name
Voucher type
Voucher amount
Voucher service provider
Reference of body image included into the body (starting and ending byte). The response body may include a string of bytes for the image.

TABLE 2

Voucher quantity
Voucher identification number
Voucher amount
Voucher service provider Synchronization may also include removing used or expired digital vouchers from the device 600. The digital voucher management logic 616 may include logic operable to flag any used or expired digital voucher for deletion.

The proximate merchant identification logic 618 aids the device 600 in detecting whether a digital voucher enabled merchant system is proximate to the proximity communication interface 602. The proximity communication interface 602 may be configured for NFC, Bluetooth, RFID, IrDa, or other proximity communication protocols.

When sufficiently proximate to a corresponding proximity communication interface of a merchant system, the device 600 may receive merchant data and transaction data associated with a business transaction. The merchant data may include information identifying the merchant. The transaction data may include information identifying the type and quantity of good or service being purchased, as well as the purchase price.

The digital voucher transfer logic 620 aids the device 600 in transmitting a digital voucher 612 to the merchant in connection with the business transaction. The digital voucher transfer logic 620 may automatically select a digital voucher to be transferred to the merchant, or may provide a user interface through the display 608 through which the user selects the digital voucher to be used. The digital voucher transfer logic 620 may display to the user all digital vouchers 612 held on the memory, or may tailor which vouchers to display to the user based on, for example, the merchant the user is transacting business with. For example, some digital vouchers 612 may only apply to specific merchants. Other digital vouchers 612 may only apply to a specific type of good or service. A digital voucher 612 held on the memory 606 may be a coupon for a free soft drink with the purchase of a sandwich from a particular food merchant. If the transaction data received from the merchant system indicates that a sandwich is not being purchased and thus that the digital voucher cannot be used, the digital voucher transfer logic 620 may hide that particular digital voucher from display in order to present the user with the most relevant digital voucher options.

When a digital voucher 612 is selected, the digital voucher transfer logic 618 transmits the digital voucher 612 to the merchant system through the proximity communication interface 602. The digital voucher 612 may include voucher data such as expiration date, value of the digital voucher, applicable merchants or good or services, or other information that may assist the merchant system in processing the digital voucher 612. When a digital voucher 612 is selected, the digital voucher transfer logic 620 may also display a barcode image representing the voucher data, as well as any other pertinent data (e.g., consumer data) to be captured by the proximity communication interface of the merchant system.

The digital voucher transfer logic 620 may also transmit consumer data 624 held on the memory to the merchant system through the proximity communication interface 602. The consumer data may include information identifying the consumer or the consumer's device 600, such as a proper name, a user name, the MSISDN of the device 600, or other identifying information.

Figure 7:
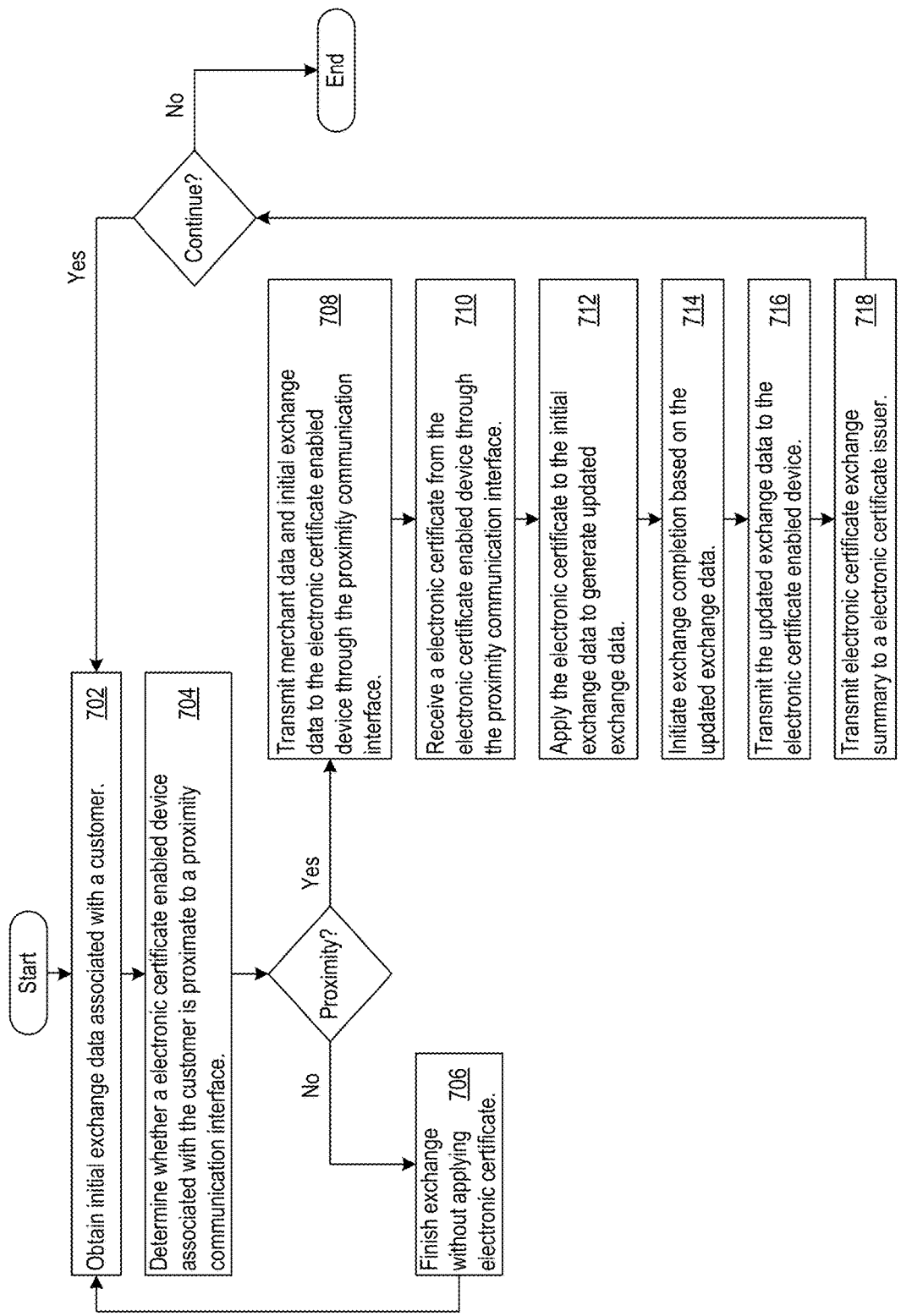
FIG. 7 shows logic that a digital voucher merchant application installed on a digital voucher enabled merchant system may execute to handle digital vouchers.

FIG. 7 shows logic that a digital voucher merchant application installed on a digital voucher enabled merchant system may execute to handle digital vouchers. Digital voucher acquisition logic of the merchant application obtains initial transaction data associated with a customer (702). The initial transaction data may be a purchase price of the goods or services being purchased by the consumer. The initial transaction data may also include information identifying the type and quantity of goods or services being purchased. The voucher acquisition logic may store the initial transaction data on a memory of the merchant system.

The voucher acquisition logic may prompt merchant personnel to enter the initial transaction data, such as the purchase price, in order to obtain the initial transaction data. The merchant system may also be connected, directly or through a network, to a cash register or other electronic device for calculating and recording sales transactions. Through that connection, the voucher acquisition logic may obtain the initial transaction data from the electronic transaction device.

The voucher acquisition logic determines whether a digital voucher enabled mobile device, such as a cellular device, associated with the transacting consumer is proximate to a proximity communication interface of the merchant system (704). If the proximity communication interface is an NFC device, the NFC device of the merchant system will detect an NFC device on a digital voucher enabled mobile device when the respective NFC devices are within approximately 10 cm from each other. The voucher acquisition logic may query the proximity communication interface to determine if a digital voucher enabled mobile device is proximate to the merchant system.

If no digital voucher enabled mobile device associated with the transacting customer is proximate to the proximity communication interface of the merchant system, the transaction is completed without applying any digital voucher to the transaction (706). If the voucher acquisition logic determines that a digital voucher enabled mobile device is proximate to the proximity communication interface of the merchant system, the voucher acquisition logic may transmit merchant data and the initial transaction data to the digital voucher enabled mobile device through the proximity communication interface (708).

The voucher acquisition logic receives a digital voucher from the digital voucher enable mobile device through the proximity communication interface (710). The digital voucher may include voucher data identifying the type, quantity, and/or amount of the digital voucher, an expiration data, a voucher ID number, a voucher service provider, or other relevant information. If the digital voucher was acquired by capturing a barcode image displayed on the mobile device, the voucher acquisition logic may decode the captured barcode image to obtain the digital voucher data.

Voucher processing logic of the merchant application applies the digital voucher to the initial transaction data to generate updated transaction data (712). The voucher processing logic may determine a value of the digital voucher based on the voucher data and reduce or otherwise modify the initial transaction data by the determined value. If the digital voucher is a 10% off coupon, the voucher processing logic reduces the purchase price by 10%. If the digital voucher is a €10 off coupon, the application subtracts €10 from the purchase price. If the digital voucher is a ticket restaurant valued at €5, the voucher processing logic reduces the meal cost by €5.

If the digital voucher is a fidelity card that earns the customer points on purchases made from the merchant, the voucher processing logic may updated the consumers' points total based on the purchase price. In the fidelity card example, the updated transaction data may include a report indicating the consumers' total fidelity points after the transaction. In other examples, the updated transaction data may include an updated purchase price.

The voucher processing logic may initiate transaction completion based on the updated transaction data (714). The voucher processing logic may transmit the updated transaction data to the merchant's electronic transaction device (such as the cash register) in order to charge the customer the updated transaction amount. The voucher processing logic may display the updated transaction data to merchant personnel to allow the merchant personnel to modify the purchase amount shown on the electronic transaction device and charge the correct the updated amount to the consumer. The voucher processing logic may transmit the updated transaction data to the digital voucher enabled mobile device through the proximity communication interface (716).

The voucher processing logic may transmit a digital voucher transaction summary to a digital voucher service provider (718). The digital voucher transaction summary may include a summary of the transaction in which the digital voucher was used. The summary may include information identifying the digital voucher used, the type and/or quantity of good or service purchased, the consumer, the consumer's mobile device, the merchant, the transaction date, or other information relevant to the transaction.

Figure 8:
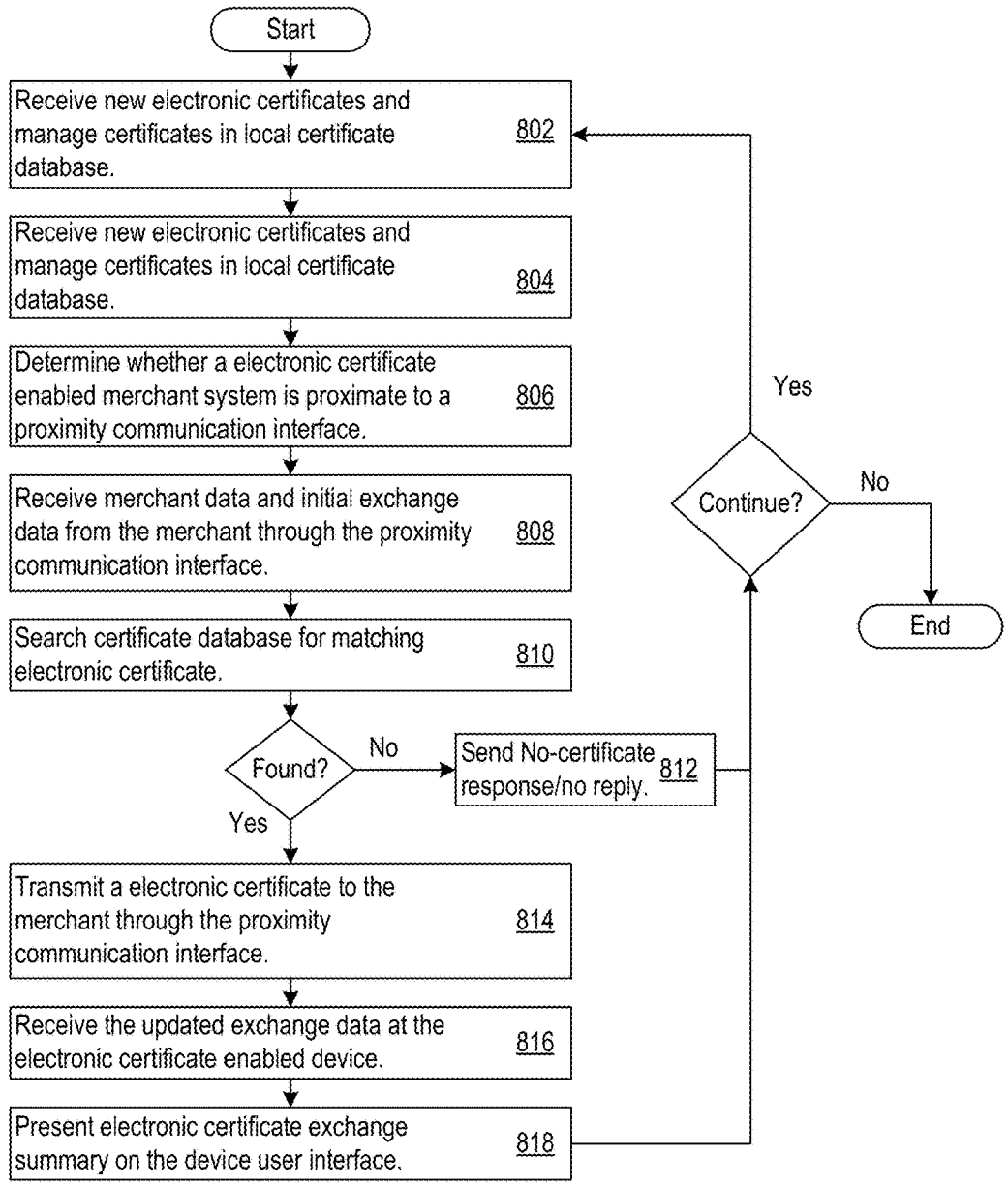
FIG. 8 shows logic that a digital voucher subscriber application installed on a digital voucher enabled device may execute to handle digital vouchers.

FIG. 8 shows logic that a digital voucher subscriber application installed on a digital voucher enabled device may execute to handle digital vouchers. Digital voucher management logic of the subscriber application receives notification of new digital vouchers and manages the digital vouchers in a local voucher database (802). The voucher management logic may receive an SMS message, email, or other communication indicating that new digital vouchers have been assigned to the mobile device.

The voucher management logic synchronizes a user account stored on the mobile device with a remote user account maintained by the entity directing voucher distribution, such as an enterprise system or a digital voucher service provider (804). The new digital vouchers may be organized and managed with any existing digital vouchers stored on the mobile device. With the digital vouchers transferred to and stored on the mobile device, the consumer is able to transfer the digital vouchers to nearby merchants in paperless, real time, and secure digital voucher transfers.

The subscriber application detects whether a digital voucher enabled merchant system is proximate to a proximity communication interface of the mobile device (806). If the proximity communication interface is an NFC device, the NFC device of the mobile device will detect an NFC device on a digital voucher enabled merchant system when the respective NFC devices are within approximately 10 cm from each other. The subscriber application may query the proximity communication interface to determine if a digital voucher enabled merchant system is proximate to the mobile device.

If a digital voucher enabled merchant system is proximate to the mobile device, the subscriber application receives merchant data and the initial transaction data through the proximity communication interface (808). Based on the merchant data and initial transaction data, the subscriber application may search the voucher database for a matching digital voucher (810). The consumer may prompt the consumer through a display to select a digital voucher. The subscriber application may be operable to automatically match the merchant and initial transaction data with a digital voucher. If no matching digital voucher is found by the subscriber application or selected by the consumer, the application transmits a no-voucher response to the merchant through the proximity communication interface, or merely sends no data at all to the merchant (812).

If a matching digital voucher is found by the subscriber application or selected by the user, the subscriber application transmits the digital voucher to the merchant through the proximity communication interface (814). The subscriber application may also transmit consumer data to the merchant through the proximity communication interface.

On the merchant side, the merchant applies the digital voucher to the initial transaction data to generate updated transaction data. The subscriber application may receive the updated transaction data through the proximity communication interface (816). The subscriber application may present a digital voucher transaction summary on a user interface of the mobile device (818). The digital voucher transaction summary may include the initial and updated transaction data, an amount saved, the digital voucher used, the type and quantity of goods or services purchased, or other information relevant to the transaction. The subscriber application may also transmit the digital voucher transaction summary to a digital voucher service provider, enterprise system, or other entity that directs the issuance and distribution of digital vouchers.

Figure 9:
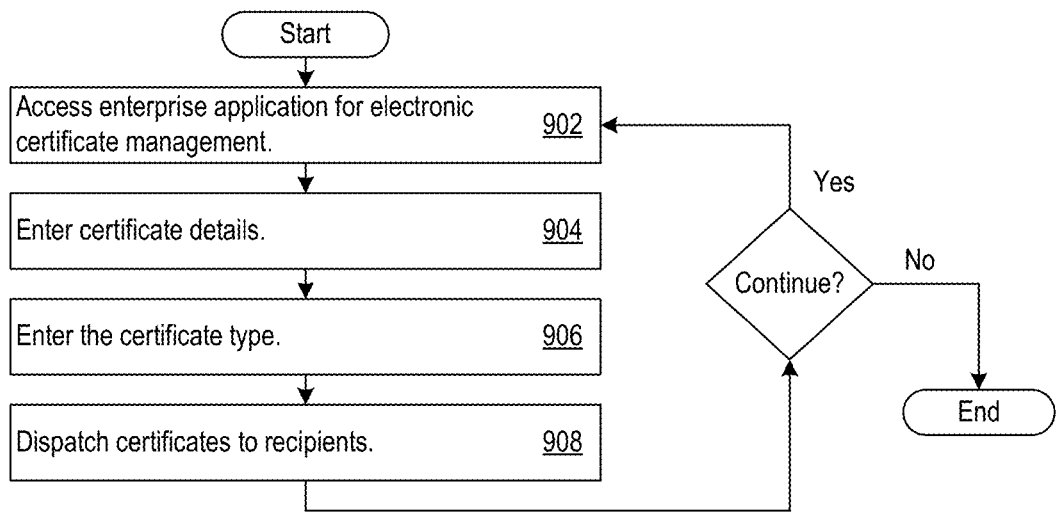
FIG. 9 shows a flow diagram of digital voucher creation.

FIG. 9 shows a flow diagram of digital voucher creation by an enterprise application. An enterprise manager accesses the enterprise application for digital voucher creation and management (902). The manager may interact with the enterprise application through a user interface provided by the application. The enterprise application may run on a desktop, handheld, or other computing device.

The manager enters voucher details (904), including expiration date, distribution group, distribution quantity, or other voucher information. The distribution quantity may indicate how many of each voucher should be distributed to the members of the distribution group. The distribution group identifies the consumers to which the vouchers will be assigned an ultimately distributed. The distribution group may identify a set or subset of employees of a company to receive digital vouchers. If the digital vouchers are to be assigned to employees of a company, the voucher details may also include a company name. The voucher details may also include the MSISDN, or a list of MSISDN's, of the mobile device(s) to receive the assigned digital vouchers.

The manager selects the digital vouchers to be sent (906). The enterprise application may provide the manager with a list of digital vouchers organized by voucher type (such as "promotional", "ticket", and "voucher"). The enterprise application may also indicate for each listed digital voucher the voucher's value, as well as whether the voucher applies to any specific goods, services, and/or merchants.

After the vouchers to be distributed are identified, the enterprise application dispatches the digital vouchers to the designated recipients at the managers instructions (908). The enterprise application may provide, for example, a "send vouchers" bottom that the manager clicks or presses to dispatch the vouchers. Dispatching the digital vouchers may include transmitting instructions (such as voucher type, distribution group) to a voucher service provider for the distribution of the digital vouchers to the designated recipients. The enterprise application may also transmit a notification through an SMS message, email, or other communication to the designated recipients that the new digital vouchers have been assigned.

Exemplary aspects, features, and components of the system are described above. However, the system may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, or other media. The logic and data structures may be transmitted in a tangible signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method, including:
obtaining a new voucher message via a cellular data interface of a mobile device, the new voucher message indicating that digital vouchers are available from an enterprise system of a digital voucher issuer, the new voucher message sent responsive to a dispatch command issued by a manager of the digital voucher issuer;
after obtaining the new voucher message:
obtaining, via a hypertext transfer protocol (HTTP) over via cellular data interface, a new digital voucher from the enterprise system, parameters for the new digital voucher downloaded while encoded as a HTTP metadata structure including:
a voucher quantity field;
after the voucher quantity field, a voucher name field;
after the voucher name field, a voucher type field;
after the voucher type field, a voucher amount field;
after the voucher amount field, a voucher provider field including an indicator of a service provider for the digital voucher; and
after the voucher provider field, an image field including a reference of an image of the new digital voucher, the reference including a starting byte and an ending byte;
storing the new digital voucher in memory among multiple other digital vouchers also stored in the memory as metadata structures, the metadata structures including:
metadata structures for digital vouchers that include an image field after the voucher provider field;
deleting a previously stored voucher that has expired from among the multiple other digital vouchers;
determining, using proximity detection via a proximity communication interface, that the digital voucher enabled merchant system is within a predetermined distance of the mobile device; and
in response to the determination that the digital voucher enabled merchant system is within the predetermined distance of the mobile device, receiving, via the proximity communication interface, initial transaction data for a transaction from the digital voucher enabled merchant system, the initial transaction data including:
a merchant identifier for the digital voucher enabled merchant system;
transaction type information; and
an initial transaction amount;
without requesting user input, comparing the data structure to the initial transaction data by comparing:
the voucher type field of the data structure to the transaction type information; and
the voucher provider field of the data structure to the merchant identifier;
receiving, from user input, a selection of the new digital voucher within the digital voucher listing responsive to the presentation of the digital voucher listing;
transmitting, to the digital voucher enabled merchant system using the proximity communication interface, a response to the initial transaction data, the response including:
the new digital voucher; and
a name of the user;
transmitting, via the digital voucher enabled merchant system, the response to a back-end system for:
calculation of an updated transaction amount modified with respect to the initial transaction amount based on the new digital voucher; and
recording the transaction;
receiving, at the digital voucher enabled merchant system, updated transaction data comprising the updated transaction amount modified with respect to the initial transaction amount based on the new digital voucher;

receiving, at the mobile device, the updated transaction data from the digital voucher enabled merchant system;
responsive to the updated transaction data, instructing the display to present a digital voucher transaction summary;
generating a digital voucher transaction report including:
an identifier for the new digital voucher;
a transaction identifier; and
data indicating a type of good or service subject to the transaction; and
transmitting the digital voucher transaction report to the enterprise system using the cellular data interface.

2. The method of claim 1, where the new digital voucher includes a restaurant voucher.

3. The method of claim 1, where:
the new digital voucher includes a fidelity card that earns a customer points on purchases made from a merchant; and
the method further includes updating a points total associated with a user in response to a transaction.

4. The method of claim 1, where the new digital voucher assigned to the mobile device according to a distribution criterion met by a user account, the distribution criterion based on user purchase history and user browsing history data.

5. The method of claim 1, where the mobile device includes a cell phone, a portable game system, a personal data assistant, a music player, or any combination thereof.

6. The method of claim 1, where the new digital voucher includes a voucher for a discount for good, services, or any combination thereof.

7. The method of claim 1, further including displaying, on the mobile device, a linear barcode, a two-dimensional code, or any combination thereof to communicate the new digital voucher to a merchant system.

8. The method of claim 1, further including communicating, via the mobile device, the new digital voucher to a merchant system via a SMS (short message service) message, an email message, or any combination thereof.

9. The method of claim 1, further including receiving, at the mobile device, from the enterprise system a summary that includes an amount due for a transaction.

10. A mobile device, including:
a cellular data interface;
a processor; and
memory including instructions configured to cause the processor to:
obtain a new voucher message via the cellular data interface, the new voucher message indicating that digital vouchers are available from an enterprise system of a digital voucher issuer, the new voucher message sent responsive to a dispatch command issued by a manager of the digital voucher issuer;
after obtaining the new voucher message:
obtain, via a hypertext transfer protocol (HTTP) over via cellular data interface, a new digital voucher from the enterprise system, parameters for the new digital voucher downloaded while encoded as a HTTP metadata structure including:
a voucher quantity field;
after the voucher quantity field, a voucher name field;
after the voucher name field, a voucher type field;
after the voucher type field, a voucher amount field;
after the voucher amount field, a voucher provider field including an indicator of a service provider for the digital voucher; and
after the voucher provider field, an image field including a reference of an image of the new digital voucher, the reference including a starting byte and an ending byte;
store the new digital voucher in the memory among multiple other digital vouchers also stored in the memory as metadata structures, the metadata structures including:
metadata structures for digital vouchers that include an image field after the voucher provider field; and
delete a previously stored voucher that has expired from among the multiple other digital vouchers;
determine, using proximity detection via a proximity communication interface, that the digital voucher enabled merchant system is within a predetermined distance of the mobile device; and
in response to the determination that the digital voucher enabled merchant system is within the predetermined distance of the mobile device, receive, via the proximity communication interface, initial transaction data for a transaction from the digital voucher enabled merchant system, the initial transaction data including:
a merchant identifier for the digital voucher enabled merchant system;
transaction type information; and
an initial transaction amount;
without requesting user input, compare the data structure to the initial transaction data by comparing:
the voucher type field of the data structure to the transaction type information; and
the voucher provider field of the data structure to the merchant identifier;
receive, from user input, a selection of the new digital voucher within the digital voucher listing responsive to the presentation of the digital voucher listing;
transmit, to the digital voucher enabled merchant system using the proximity communication interface, a response to the initial transaction data, the response including:
the new digital voucher; and
a name of the user;
transmit, via the digital voucher enabled merchant system, the response to a back-end system for:
calculation of an updated transaction amount modified with respect to the initial transaction amount based on the new digital voucher; and
recording the transaction;
receive, at the digital voucher enabled merchant system, the updated transaction data;
receive updated transaction data from the digital voucher enabled merchant system, the updated transaction data comprising an updated transaction amount modified with respect to the initial transaction amount based on the new digital voucher;
responsive to the updated transaction data, instruct the display to present a digital voucher transaction summary;
generate a digital voucher transaction report including:
an identifier for the new digital voucher;
a transaction identifier; and
data indicating a type of good or service subject to the transaction; and transmit the digital voucher transaction report to the enterprise system using the cellular data interface.

11. The mobile device of claim 10, further including a display configured to display a linear barcode, a two-dimensional code, or any combination thereof to communicate the new digital voucher to a merchant system.

12. A product including:
non-transitory machine-readable media; and
instructions stored on the machine-readable media, the instructions configured to, when executed, cause a machine to perform:
  obtaining, via a hypertext transfer protocol (HTTP) over via cellular data interface, a new digital voucher from the enterprise system, parameters for the new digital voucher downloaded while encoded as a HTTP metadata structure including:
    a voucher quantity field;
    after the voucher quantity field, a voucher name field;
    after the voucher name field, a voucher type field;
    after the voucher type field, a voucher amount field;
    after the voucher amount field, a voucher provider field including an indicator of a service provider for the digital voucher; and
    after the voucher provider field, an image field including a reference of an image of the new digital voucher, the reference including a starting byte and an ending byte;
  storing the new digital voucher in memory among multiple other digital vouchers also stored in the memory as metadata structures, the metadata structures including:
    metadata structures for digital vouchers that include an image field after the voucher provider field;
  deleting a previously stored voucher that has expired from among the multiple other digital vouchers;
  determining, using proximity detection via a proximity communication interface, that the digital voucher enabled merchant system is within a predetermined distance of the mobile device; and
  in response to the determination that the digital voucher enabled merchant system is within the predetermined distance of the mobile device, receiving, via the proximity communication interface, initial transaction data for a transaction from the digital voucher enabled merchant system, the initial transaction data including:
    a merchant identifier for the digital voucher enabled merchant system;
    transaction type information; and
    an initial transaction amount;
  without requesting user input, comparing the data structure to the initial transaction data by comparing:
    the voucher type field of the data structure to the transaction type information; and
    the voucher provider field of the data structure to the merchant identifier;
  receiving, from user input, a selection of the new digital voucher within the digital voucher listing responsive to the presentation of the digital voucher listing;
  transmitting, to the digital voucher enabled merchant system using the proximity communication interface, a response to the initial transaction data, the response including:
    the new digital voucher; and
    a name of the user;
  transmitting, via the digital voucher enabled merchant system, the response to a back-end system for:
    calculation of an updated transaction amount modified with respect to the initial transaction amount based on the new digital voucher; and
    recording the transaction;
  receiving, at the digital voucher enabled merchant system, updated transaction data comprising the updated transaction amount modified with respect to the initial transaction amount based on the new digital voucher;
  receiving, at the mobile device, the updated transaction data from the digital voucher enabled merchant system;
  responsive to the updated transaction data, instructing the display to present a digital voucher transaction summary;
  generating a digital voucher transaction report including:
    an identifier for the new digital voucher;
    a transaction identifier; and
    data indicating a type of good or service subject to the transaction; and
  transmitting the digital voucher transaction report to the enterprise system using the cellular data interface.

13. The system of claim 12, where the new digital voucher includes a restaurant voucher.

14. The system of claim 12, where:
the new digital voucher includes a fidelity card that earns a customer points on purchases made from a merchant; and
the method further includes updating a points total associated with a user in response to a transaction.

15. The system of claim 12, where the new digital voucher assigned to the mobile device according to a distribution criterion met by a user account, the distribution criterion based on user purchase history and user browsing history data.

16. The system of claim 12, where the mobile device includes a cell phone, a portable game system, a personal data assistant, a music player, or any combination thereof.

17. The system of claim 12, where the new digital voucher includes a voucher for a discount for good, services, or any combination thereof.

18. The system of claim 12, further including displaying, on the mobile device, a linear barcode, a two-dimensional code, or any combination thereof to communicate the new digital voucher to a merchant system.

19. The system of claim 12, further including communicating, via the mobile device, the new digital voucher to a merchant system via a SMS (short message service) message, an email message, or any combination thereof.

20. The system of claim 12, further including receiving, at the mobile device, from the enterprise system a summary that includes an amount due for a transaction.

* * * * *